(12) United States Patent
Takashima et al.

(10) Patent No.: US 8,427,531 B2
(45) Date of Patent: Apr. 23, 2013

(54) STEREOSCOPIC IMAGE DISPLAY APPARATUS

(75) Inventors: Kazuhiro Takashima, Tokyo (JP); Kiyoshi Hoshino, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/403,721

(22) Filed: Feb. 23, 2012

(65) Prior Publication Data

US 2013/0050196 A1 Feb. 28, 2013

(30) Foreign Application Priority Data

Aug. 31, 2011 (JP) ................................ 2011-189484

(51) Int. Cl.
*H04N 13/04* (2006.01)
(52) U.S. Cl.
USPC .................. 348/51; 348/42; 348/43; 348/44; 348/45; 348/46; 348/47; 348/48; 348/49; 348/50; 348/52; 348/53; 348/54; 348/55; 348/56; 348/57; 348/58; 348/59; 348/60
(58) Field of Classification Search ............... 348/42–60
See application file for complete search history.

(56) References Cited

U.S. PATENT DOCUMENTS

| | | | |
|---|---|---|---|
| 7,940,956 B2 | 5/2011 | Kinoshita et al. | |
| 8,081,206 B2 * | 12/2011 | Martin et al. | 348/42 |
| 2007/0013791 A1 | 1/2007 | Kinoshita et al. | |
| 2008/0266525 A1 * | 10/2008 | Relke et al. | 353/8 |
| 2011/0243388 A1 | 10/2011 | Sakaguchi et al. | |
| 2011/0261164 A1 * | 10/2011 | Olesen et al. | 348/46 |
| 2012/0033046 A1 * | 2/2012 | Ozaki | 348/46 |
| 2012/0062709 A1 * | 3/2012 | Kerofsky et al. | 348/51 |
| 2012/0081520 A1 * | 4/2012 | Lee et al. | 348/47 |
| 2012/0092448 A1 * | 4/2012 | Tokunaga et al. | 348/42 |
| 2012/0268567 A1 * | 10/2012 | Nakazato et al. | 348/46 |

FOREIGN PATENT DOCUMENTS

| | | |
|---|---|---|
| JP | 10-271536 A | 10/1998 |
| JP | 11-234705 A | 8/1999 |
| JP | 2003-186411 A | 7/2003 |
| JP | 2005-142957 A | 6/2005 |
| JP | 2007-042072 A | 2/2007 |
| JP | 2011-090400 A | 5/2011 |

OTHER PUBLICATIONS

Japanese Office Action dated May 18, 2012 of corresponding Japanese Patent Application No. 2011-189484 (2 pages).

* cited by examiner

*Primary Examiner* — Andy Rao
*Assistant Examiner* — Shan Elahi
(74) *Attorney, Agent, or Firm* — Knobbe Martens Olson & Bear LLP

(57) ABSTRACT

A stereoscopic image display apparatus according to an embodiment includes: a display device including a display panel including pixels, and an optical plate controlling light rays emitted from pixels; a camera provided in the display device; a face tracking unit making a decision whether a viewer exists in front of the display device based on an image picked up by the camera, and if the viewer exists, sampling and detecting a distance from the display device to the viewer and a position of the viewer; a memory storing the position of the viewer sampled and detected by the face tracking unit; and an image display control unit estimating the position of the viewer based on the position of the viewer stored in the memory and driving and controlling the display panel on based on the estimated position, when the face tracking unit does not recognize that the viewer exists.

4 Claims, 3 Drawing Sheets

STEREOSCOPIC IMAGE DISPLAY APPARATUS

CROSS-REFERENCE TO RELATED APPLICATION

This application is based upon and claims the benefit of priority from prior Japanese Patent Application No. 2011-189484 filed on Aug. 31, 2011 in Japan, the entire contents of which are incorporated herein by reference.

FIELD

Embodiments described herein relate generally to a stereoscopic image display apparatus.

BACKGROUND

In the case of an autostereoscopic image display apparatus, a viewer (user) can view a stereoscopic image with naked eyes without using special glasses. In such a stereoscopic image display apparatus, a plurality of images which differ in viewpoint are displayed on a plane display device (for example, a liquid crystal display device) and light rays from these images are controlled by an optical plate such as a parallax barrier or a lenticular lens. As a result, the viewer views a stereoscopic image. In general, the optical plate is provided in front of the plane display device. The controlled light rays are led to both eyes of the viewer. If the viewing position of the viewer is adequate, the viewer can view a stereoscopic image. A zone of viewing positions where such a stereoscopic image can be visually recognized is referred to as viewing zone.

However, there is a problem that such a viewing zone is limitative. In other words, there is a pseudoscopy zone formed of viewing positions where, for example, a viewpoint of an image perceived by a left eye is located relatively on the right side as compared with a viewpoint of an image perceived by a right eye and consequently it becomes impossible to perceive a stereoscopic image correctly. In an autostereoscopic image display apparatus, therefore, a normal stereoscopic image cannot be viewed in some cases depending upon the viewing position of the viewer.

Therefore, it is conducted to enable viewing a correct stereoscopic image by providing a sensor on a stereoscopic image display apparatus to detect the position of the viewer, displaying an image as it is when the viewer is judged to be located in a viewing zone on the basis of an output of the sensor, and controlling a display image to cause an image for the right eye and an image for the left eye to be incident respectively upon the right eye and the left eye of the viewer when the viewer is judged to be located in the pseudoscopy zone.

In general, a camera is used as the sensor. In a conventional stereoscopic image display apparatus having such a camera, a stereoscopic image displayed on the stereoscopic image display apparatus varies depending upon the position of the viewer. Further, in some cases, although any one of a plurality of viewers does not move from the position, it is recognized on the basis of an image picked up by the camera that at least one viewer is moving, and consequently a stereoscopic image is changed over. In this case, it is a problem that the stereoscopic image is changed over to viewers other than the viewer recognized as moving.

DETAILED DESCRIPTION

A stereoscopic image display apparatus according to an embodiment includes: a display device including a display panel having a display screen formed of pixels arranged in a matrix form, and an optical plate which controls light rays emitted from pixels on the display panel; a camera provided in the display device; a face tracking unit which makes a decision whether a viewer exists in front of the display device based on an image picked up by the camera, and if the viewer exists, samples and detects a distance from the display device to the viewer and a position of the viewer; a memory which successively stores the position of the viewer sampled and detected by the face tracking unit; and an image display control unit which, when the face tracking unit does not recognize that the viewer exists, estimates the position of the viewer based on the position of the viewer stored in the memory and drives and controls the display panel on the basis of the estimated position.

Hereafter, embodiments will be described with reference to the drawings.

First Embodiment

Figure 1:
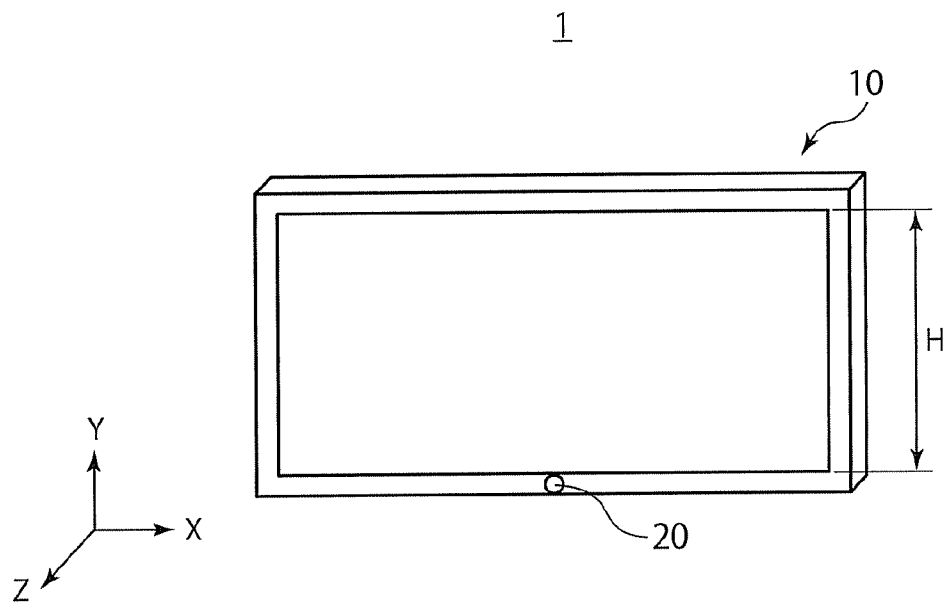
FIG. 1 is a diagram for explaining a stereoscopic image display apparatus according to an embodiment.
Figure 1:
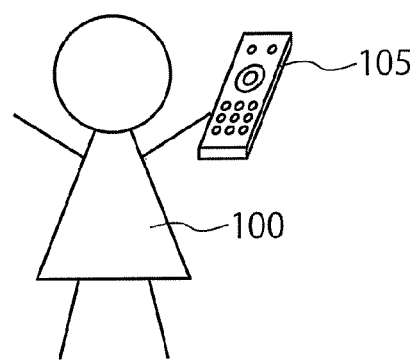

A stereoscopic image display apparatus according to a first embodiment is shown in FIG. 1. The stereoscopic image display apparatus 1 in this embodiment is an autostereoscopic image display apparatus including a display device 10 which displays an image and a camera 20 which detects a position of a viewer on the basis of the image picked up. The display device 10 has a screen formed of pixels arranged in a matrix form. The camera 20 is, for example, provided in a bottom frame included in a frame which surrounds the display screen of the display device 10.

Further, in the stereoscopic image display apparatus according to the present embodiment, a coordinate system XYZ is set. For example, the coordinate system XYZ is set by taking a plane parallel to the display screen of the display device 10 as an X-Y plane and taking a direction which is perpendicular to the X-Y plane and which approaches a viewer 100 as a positive direction of a Z axis. Incidentally, an X axis is set to be parallel to a lateral direction (horizontal direction) of the display screen, and a Y axis is set to be parallel to a longitudinal direction (vertical direction) of the display screen.

Figure 2:
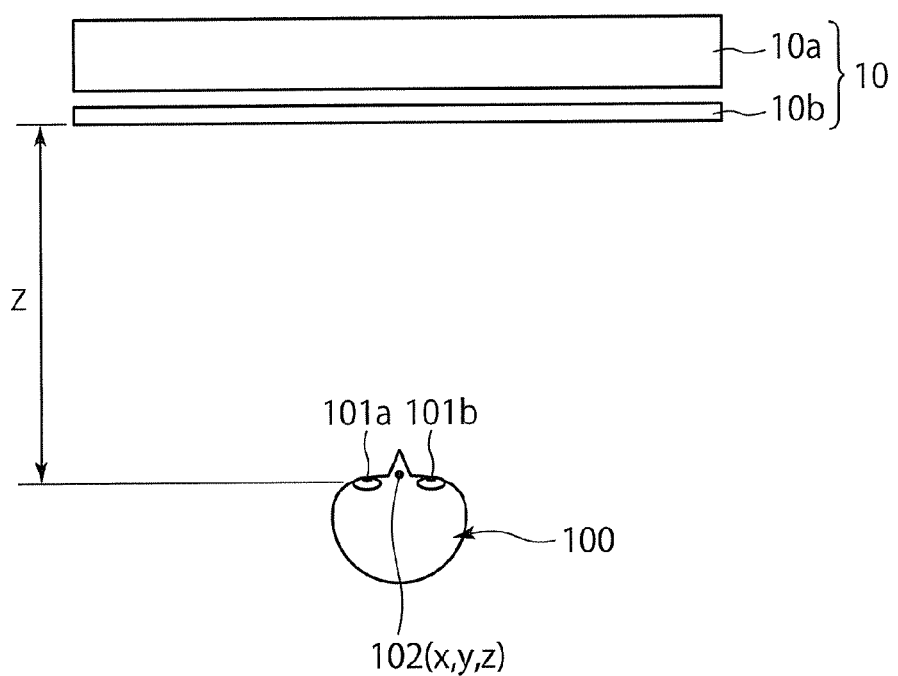
FIG. 2 is a diagram for explaining a stereoscopic image display apparatus according to an embodiment.

As shown in FIG. 2, the display device 10 includes a display panel 10a and an optical plate 10b provided in front of the display panel 10a. The optical plate 10b is, for example, a parallax barrier, a lenticular lens, or the like. The optical plate 10b controls light rays emitted from pixels in the display screen.

Figure 3:
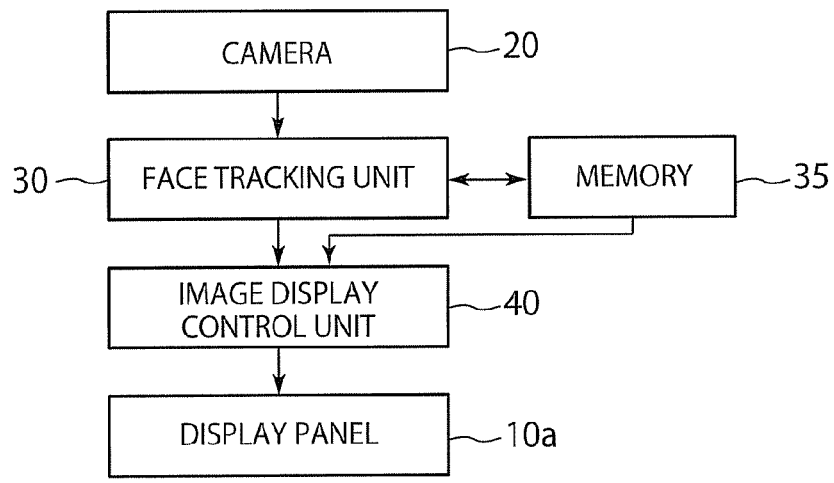
FIG. 3 is a block diagram for explaining a stereoscopic image display apparatus according to an embodiment.

As shown in FIG. 3, the stereoscopic image display apparatus 1 according to the present embodiment includes a face tracking unit 30, a memory 35, and an image display control unit 40. The face tracking unit 30 conducts image processing on an image picked up by the camera 20 and makes a decision whether a viewer exists in front of the display device 10. If the viewer 100 exists, the face tracking unit 30 detects a distance from the display device 10 to the viewer 100 and the position of the viewer 100 in the coordinate system. The face tracking unit 30 recognizes a face of the viewer 100 by conducting processing on an image supplied from the camera 20, and detects the distance from the display device 10 to the viewer 100 and the position of the viewer 100 in the coordinate system on the basis of the size of the face. For example, the camera 20 recognizes both eyes, that is, a left eye 101*a* and a right eye 101*b* of the viewer 100. Since the distance between centers of both eyes is nearly constant regardless of the person, the camera 20 can find a distance z to the viewer 100 on the basis of an image including the both eyes 101*a* and 101*b*. As shown in FIG. 2, the distance z means a distance from a front face of the optical plate 10*b* to a center 102 between eyes of the viewer 100. Further, "the position of the viewer 100" means coordinates (x, y, z) of the center 102 between eyes of the viewer 100. The detection operation of the face tracking unit 30 is conducted with a constant repetition period (for example, intervals of one second to several seconds). In other words, the distance to the viewer 100 and the position of the viewer 100 are sampled with a constant repetition period. The memory 35 successively stores the distance to the viewer 100 and the position of the viewer 100 sampled by the face tracking unit 30. For example, data ranging from several samples to several tens of samples before the present time is stored. In other words, sampling is conducted in a predetermined time range (a time range of several samples to several tens of samples before the present time).

Face tracking operation in the face tracking unit 30 is conducted when the viewer 100 selects an auto tracking mode via a remote controller 105 shown in FIG. 1 (auto tracking mode is on) and an image displayed on the display device 10 is a stereoscopic image. Furthermore, the face tracking operation in the face tracking unit 30 is conducted when the viewer 100 does not select the auto tracking mode via the remote controller 105 shown in FIG. 1 (auto tracking mode is off), an image displayed on the display device 10 is a stereoscopic image, and the viewer 100 selects the auto tracking mode manually via the remote controller 105. Furthermore, the face tracking operation in the face tracking unit 30 is also conducted when the auto tracking mode is off and an image displayed on the display device 10 has changed from a two-dimensional image to a stereoscopic image.

Figure 4:
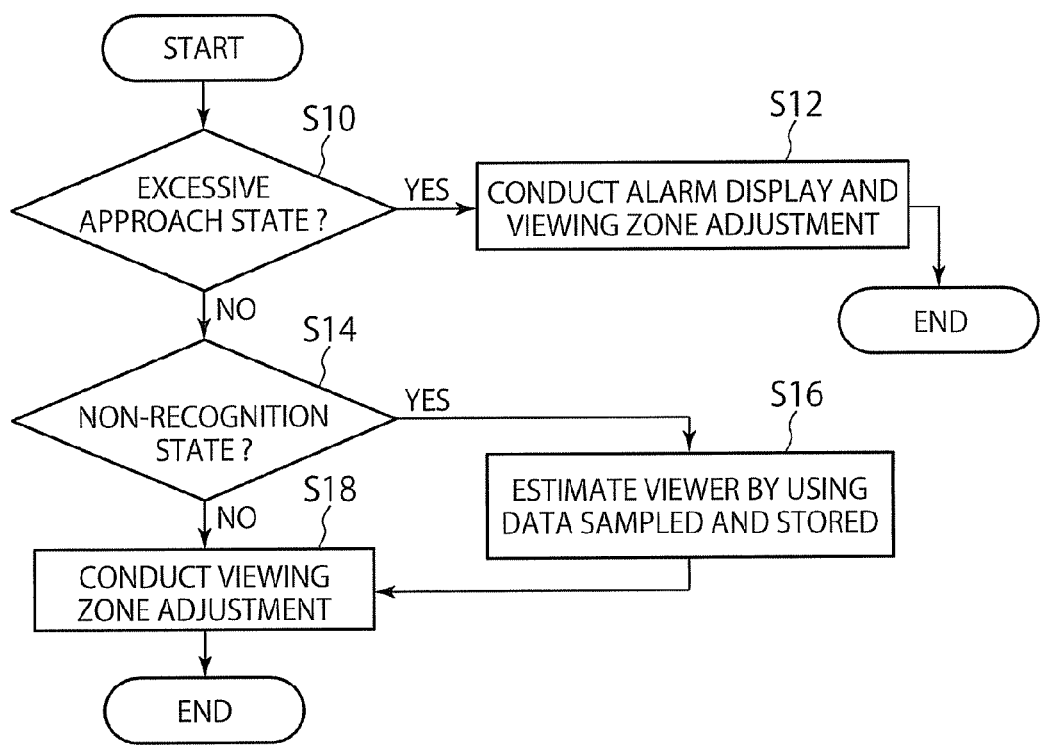
FIG. 4 is a flow chart for explaining operation of a stereoscopic image display apparatus according to an embodiment.

The image display control unit 40 makes a decision whether the viewer 100 has approached the display panel 10*a* excessively on the basis of the detected distance z (step S10 in FIG. 4). As for the decision whether the viewer 100 has approached the display panel 10*a* excessively, the viewer 100 is judged to approach the display panel 10*a* excessively if $$z < 3H$$

where H is the height of the display screen of the display panel 10*a* (see FIG. 1). If the viewer 100 has approached the display panel 10*a* excessively, then a zone (viewing zone) where a stereoscopic image is normally viewed is considerably limited, and consequently the image display control unit 40 drives and controls the display panel 10*a* to display an alarm on the display screen (step S12 in FIG. 4). An alarm may also be displayed on the display screen in the case where the viewer 100 has selected the auto tracking mode manually. In any case, the image display control unit 40 may control an image displayed on the display panel 10*a* and conduct viewing zone adjustment to make it possible for the viewer 100 to view a normal stereoscopic image (step S12). This viewing zone adjustment is conducted in the case where the viewer 100 is located in a position which is out of the viewing zone. In other words, the image display control unit 40 makes a decision whether the viewer 100 is located in the viewing zone. If the viewer 100 is located in the viewing zone, then the image display control unit 40 sends an image (parallax image) to the display panel 10*a* without adjusting the viewing zone, and exerts drive control. If the viewer 100 is located in a position out of the viewing zone, then the image display control unit 40 conducts the viewing zone adjustment. For example, the image display control unit 40 exercises the drive control to display an image shifted to the left side on the display panel when the viewer is located on the right side of the viewing zone while facing the front face of the display panel and display an image shifted to the right side on the display panel when the viewer is located on the left side of the viewing zone while facing the front face of the display panel. The viewer 100 is located in the viewing zone by the viewing zone adjustment.

If the face tracking unit 30 cannot recognize the viewer 100 on the basis of an image supplied from the camera 20 (in the case of the non-recognition state) (step S14 in FIG. 4), the image display control unit 40 estimates that the viewer 100 is located in the position of the viewer 100 detected several samples before and stored in the memory 35 (step S16), conducts viewing zone adjustment, and drives and controls the display panel 10*a* (step S18).

Incidentally, the non-recognition state is a state in which none of viewers can be recognized. The following cases are conceivable.

a) Viewers are actually absent owing to temporary occasions of business.

b) A visual field of the camera is hindered by some obstacle.

c) The face position of the viewer 100 is out of the visual field of the camera to the left, right, above or below. For example, if an adult viewer 100 stands up, the face gets out of the visual field to above.

d) Although a viewer 100 exists in the visual field of the camera, the viewer cannot be recognized owing to various conditions.

As the case d), for example, a case where the face cannot be recognized because the viewer 100 wears a mask, or a case where the face cannot be recognized because the viewer 100 looks aside with respect to the display screen or looks down is conceivable.

Incidentally, if a plurality of viewers are recognized and then at least one of them becomes unrecognized and at least another person is recognized, then the image display control apparatus can not conduct the viewing zone adjustment.

The face tracking unit 30 and the image display control unit 40 can be incorporated in the display device 10, or can be provided externally to the display device 10.

If an image signal sent from the external is a two-dimensional image signal, the image display control unit 40 has a function of generating depth information of an image from the two-dimensional image signal and generating a multi-parallax image signal from the two-dimensional image signal by using the depth information, although not illustrated. Furthermore, if the image signal sent from the external is a multi-parallax image signal, the image display control unit 40 also has a function of changing the multi-parallax image signal to a multi-parallax image signal suitable for the display panel 10*a*. In addition, the image display control unit 40 also has a function of converting these multi-parallax image signals to a stereoscopic image.

According to the present embodiment, it is possible to prevent a stereoscopic image from being changed over when the viewer is not moving, as described heretofore.

Second Embodiment

A stereoscopic image display apparatus according to a second embodiment will now be described. The stereoscopic image display apparatus according to the second embodiment is obtained from the first embodiment by causing the face tracking unit 30 to conducting sampling and causing the memory 35 to generate and store a histogram on the basis of the sampled data. The histogram can be generated, for example, as described hereafter. The histogram can be generated by dividing a space of the coordinate system XYZ which is set in the first embodiment to unit cells of, for example, 1 cm³, making a decision which unit cell includes a position (x, y, z) of the viewer sampled and detected by the face tracking unit 30, counting the number of sampling data included in the unit cell, and storing the count in the memory 35. In other words, the memory 35 has a three-dimensional array M(i, j, k) (i, j, k=0, 1, 2, . . . ). Each array corresponds to each unit cell, and the number of sampling data included in each unit cell is stored in a corresponding array.

At the time of non-recognition sate, the position of the viewer 100 is estimated on the basis of the histogram generated and stored in the memory 35. Coordinates (center coordinates) of a unit cell where the histogram is maximized becomes the estimated position of the viewer 100. The image display control unit 40 drives and controls the display panel 10*a* to adjust the viewing zone by using the estimated position.

Incidentally, the histogram may be generated in a determinate time range (for example, a range of several seconds to several tens of seconds). If generation of the next histogram is started, the stored histogram may be eliminated from the memory 35.

The histogram may be generated supposing that the distance from the display device 10 to the viewer 100 is constant. For example, the distance can be set equal to 3 H, where H is a height of the display panel 10*a*. In other words, the three-dimensional array M(i, j, k) becomes a two-dimensional array M(i, j, L). Here, L is a maximum integer which does not exceed 3 H. The capacity of the memory 35 can be reduced and an amount of processing required to generate the histogram can be reduced by generating the histogram in this way.

Incidentally, the position estimation of the viewer 100 using the histogram can be used when the viewer 100 has selected the auto tracking mode manually and the state is a non-recognition state.

In the second embodiment as well, it is possible to prevent a stereoscopic image from being changed over when a viewer is not moving, in the same way as the first embodiment.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. A stereoscopic image display apparatus comprising:
   a display device comprising:
      a display panel comprising a display screen comprising pixels arranged in a matrix form; and
      an optical plate configured to control light rays emitted from the pixels on the display panel;
   a camera;
   a tracking unit configured to determine whether a viewer exists in front of the display device based on an image captured by the camera, and if the viewer exists, to determine a distance from the display device to the viewer and a position of the viewer;
   a memory configured to successively store the position of the viewer sampled and detected by the tracking unit, and to generate and store a histogram concerning the position of the viewer sampled and detected by the tracking unit; and
   an image display control unit configured to estimate the position of the viewer based on the position of the viewer stored in the memory when the tracking unit does not recognize that the viewer exists, and to estimate a position at which the histogram becomes maximum to be the position of the viewer, and to drive and control the display panel based on the estimated position.

2. The stereoscopic image display apparatus according to claim 1, wherein the generation of the histogram is conducted in a first time range.

3. The stereoscopic image display apparatus according to claim 1, wherein the histogram is generated based in part on the assumption that the distance from the display device to the viewer is constant.

4. The stereoscopic image display apparatus according to claim 1, wherein the tracking unit determines whether the viewer exists in front of the display device based on a face of the viewer.

* * * * *